(12) United States Patent
Joo et al.

(10) Patent No.: US 10,614,330 B2
(45) Date of Patent: Apr. 7, 2020

(54) CHARACTER RECOGNITION METHOD OF HANDWRITING INPUT DEVICE, HANDWRITING INPUT DEVICE, AND VEHICLE INCLUDING THE HANDWRITING INPUT DEVICE

(71) Applicants: HYUNDAI MOTOR COMPANY, Seoul (KR); KIA MOTORS CORPORATION, Seoul (KR)

(72) Inventors: Sihyun Joo, Seoul (KR); Nae Seung Kang, Siheung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 111 days.

(21) Appl. No.: 16/023,265

(22) Filed: Jun. 29, 2018

(65) Prior Publication Data

US 2019/0180127 A1 Jun. 13, 2019

(30) Foreign Application Priority Data

Dec. 11, 2017 (KR) ........................ 10-2017-0169175

(51) Int. Cl.
*G06K 9/00* (2006.01)
*G06K 9/32* (2006.01)
*G06K 9/22* (2006.01)
*G06F 3/0488* (2013.01)

(52) U.S. Cl.
CPC ..... *G06K 9/00865* (2013.01); *G06F 3/04883* (2013.01); *G06K 9/00402* (2013.01); *G06K 9/222* (2013.01); *G06K 9/3275* (2013.01); *G06K 2209/01* (2013.01)

(58) Field of Classification Search
CPC .. G06K 9/00865; G06K 9/3275; G06K 9/222; G06K 9/00402; G06K 2209/01; G06F 3/04883
See application file for complete search history.

(56) References Cited

U.S. PATENT DOCUMENTS

| 6,671,417 | B1 | 12/2003 | Koshinaka |
| 8,730,244 | B2 | 5/2014 | Yamazaki |
| 2005/0222848 | A1* | 10/2005 | Napper ............. G06K 9/00852 705/1.1 |

(Continued)

FOREIGN PATENT DOCUMENTS

| EP | 2219138 A2 | 8/2010 |
| JP | 2001-101342 A | 4/2001 |
| KR | 10-2008-0070787 A | 7/2008 |

(Continued)

*Primary Examiner* — Asghar H Bilgrami
(74) *Attorney, Agent, or Firm* — Morgan, Lewis & Bockius LLP

(57) ABSTRACT

A method for recognizing characters of handwritten input text includes: receiving, by a handwriting input area, a handwritten input text from a user; calculating, by a controller, a center axis of the handwritten input text; calculating, by the controller, a rotation angle of the center axis based on a reference axis; correcting, by the controller, a slope of the handwritten input text by the rotation angle so that the slope of the handwritten input text is parallel to the reference axis; and performing, by the controller, character recognition of the handwritten input text acquired by correction of the slope.

20 Claims, 9 Drawing Sheets

(56) References Cited

U.S. PATENT DOCUMENTS

2010/0008581 A1* 1/2010 Bressan ............ G06K 9/00859
382/177
2013/0251249 A1 9/2013 Huo et al.

FOREIGN PATENT DOCUMENTS

| KR | 10-2013-0089486 A | 8/2013 |
| KR | 10-2015-0024107 A | 3/2015 |

* cited by examiner

INPUT DIRECTION →

CHARACTER RECOGNITION METHOD OF HANDWRITING INPUT DEVICE, HANDWRITING INPUT DEVICE, AND VEHICLE INCLUDING THE HANDWRITING INPUT DEVICE

CROSS-REFERENCE TO RELATED APPLICATION

This application claims the benefit of priority to Korean Patent Application No. 10-2017-0169175, filed on Dec. 11, 2017 in the Korean Intellectual Property Office, the disclosure of which is incorporated herein by reference.

TECHNICAL FIELD

The present disclosure relates to character recognition, and more particularly, to an apparatus and method for recognizing characters of handwritten input text, and a vehicle including a handwriting input device.

BACKGROUND

Generally, input devices for vehicles are broadly classified into a button-type input device and a dial-type input device. In addition, the input device may be implemented as a touch-type input device such as a touchscreen. The improved touch-type input devices have recently been developed to recognize user-input characters and meanings thereof.

However, according to handwriting input technology for receiving handwritten data from a user, handwritten input text may be tilted at a certain angle and then input to the handwriting input device due to various restrictions of a user gesture, position of the handwriting input device, or the like. The tilted angle of the handwritten input text may reduce the rate of character recognition.

SUMMARY

An aspect of the present disclosure provides a character recognition technology for correcting a slope of handwritten input text even though the text is input while being tilted at a predetermined angle, performing conversion of the handwritten input text using the predetermined angle, and performing character recognition, thereby increasing the character recognition rate.

Additional aspects of the invention will be set forth in part in the description which follows and, in part, will be obvious from the description, or may be learned by practice of the invention.

In accordance with an exemplary embodiment of the present disclosure, a character recognition method for a handwriting input device includes: receiving, by a handwriting input area, a handwritten input text from a user; calculating, by a controller, a center axis of the handwritten input text; calculating, by the controller, a rotation angle of the center axis on the basis of a reference axis; correcting, by the controller, a slope of the handwritten input text by the rotation angle so that the slope of the handwritten input text is parallel to the reference axis; and performing, by the controller, character recognition of the handwritten input text acquired by correction of the slope.

The character recognition method may further include: calculating a group of representative dots of the received handwritten input text; and calculating the center axis of the handwritten input text from the group of representative dots.

The group of representative dots of the handwritten input text may be a set of representative dots of each of a plurality of characters constructing the handwritten input text.

The representative dots may be acquired from respective coordinates of a plurality of characters constructing the handwritten input text within a grid arranged at intervals of a predetermined number of pixels.

The representative dots may be acquired on the basis of an average value of the representative coordinates of the plurality of characters constructing the handwritten input text.

The representative dots may be acquired on the basis of a center point of the respective coordinates of the plurality of characters constructing the handwritten input text.

The character recognition method may further include: calculating a center axis of the handwritten input text by performing a least squares method on respective coordinates of a plurality of representative dots constructing a group of the representative dots.

The character recognition method may further include; calculating a center axis of the handwritten input text by performing an averaging method on respective coordinates of a plurality of representative dots constructing a group of the representative dots.

The calculating the center axis may include: detecting an input direction of the handwritten input text; detecting whether an angle between the rotation angle and the reference axis is an acute angle or an obtuse angle; and calculating the center axis on the basis of the detection result of the input direction and the detection result of the acute angle or the obtuse angle.

The character recognition method may further include: starting a task for discriminating an angle of the center axis of the handwritten input text even when the handwritten input text is partially input.

In accordance with another aspect of the present disclosure, a handwriting input device includes: a handwriting input area handwriting input area configured to receive a handwritten input text from a user; and a controller configured to calculate a center axis of the handwritten input text, calculate a rotation angle of the center axis based on a reference axis, correct a slope of the handwritten input text by the rotation angle so that the slope of the handwritten input text is parallel to the reference axis, and perform character recognition of the handwritten input text acquired by correction of the slope.

The controller may calculate a group of representative dots of the received handwritten input text, and may calculate the center axis of the handwritten input text from the group of representative dots.

The group of representative dots of the handwritten input text may be a set of representative dots of each of a plurality of characters constructing the handwritten input text.

The controller may acquire representative dots from respective coordinates of a plurality of characters constructing the handwritten input text within a grid arranged at intervals of a predetermined number of pixels.

The controller may acquire representative dots on the basis of an average value of the representative coordinates of the plurality of characters constructing the handwritten input text.

The controller may acquire representative dots on the basis of a center point of the respective coordinates of the plurality of characters constructing the handwritten input text.

The controller may calculate a center axis of the handwritten input text by performing a least squares method on respective coordinates of a plurality of representative dots constructing a group of the representative dots.

The controller may calculate a center axis of the handwritten input text by performing an averaging method on respective coordinates of a plurality of representative dots constructing a group of the representative dots.

The controller for calculating the center axis may detect an input direction of the handwritten input text, may detect whether an angle between the rotation angle and the reference axis is an acute angle or an obtuse angle, and may calculate the center axis on the basis of the detection result of the input direction and the detection result of the acute angle or the obtuse angle.

The controller may start a task for discriminating an angle of the center axis of the handwritten input text even when the handwritten input text is partially input.

In accordance with another aspect of the present disclosure, a vehicle including a handwriting input device includes: a handwriting input area handwriting input area configured to receive a handwritten input text; and a controller configured to calculate a center axis of the handwritten input text, calculate a rotation angle of the center axis on the basis of a reference axis, correct a slope of the handwritten input text by the rotation angle so that the slope of the handwritten input text is arranged parallel to the reference axis, and perform character recognition of the handwritten input text acquired by correction of the slope.

The controller may calculate a group of representative dots of the received handwritten input text, and may calculate the center axis of the handwritten input text from the group of representative dots.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
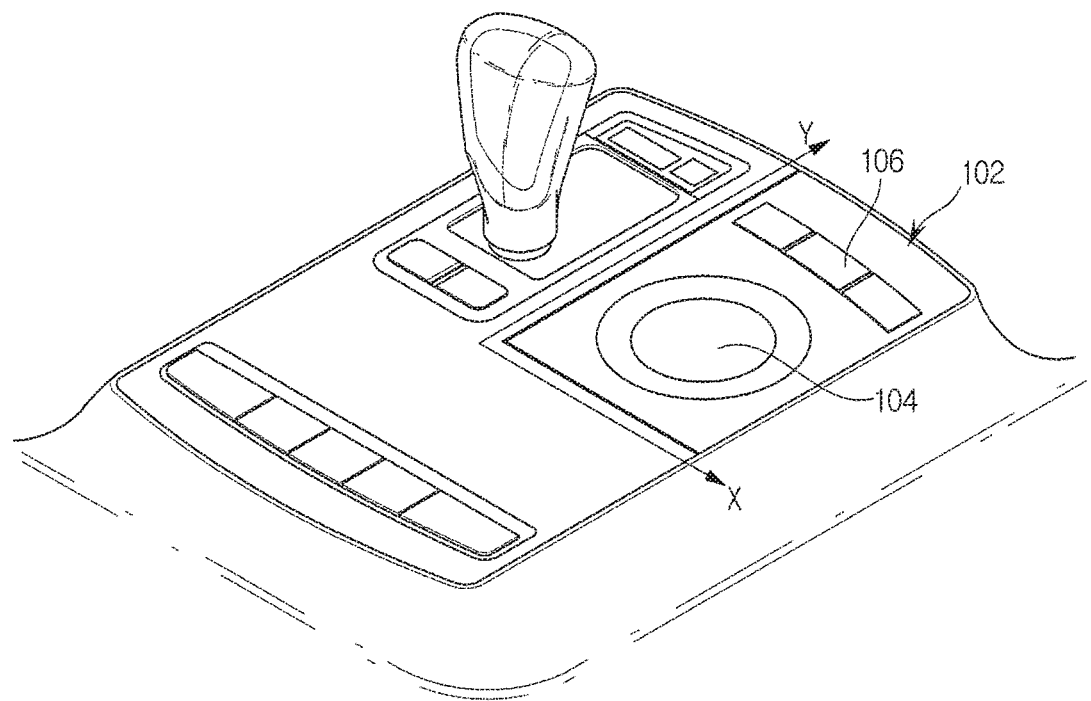
FIG. 1 is a view illustrating a handwriting input device according to an embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating a handwriting input device according to an embodiment of the present disclosure.

Referring to FIG. 1, a handwriting input device 102 may be disposed in a space between a driver seat and a passenger seat. The handwriting input device 102 may be installed at a position where a vehicle driver seated on the driver seat is able to perform a handwritten input.

The handwriting input device 102 may include a handwriting input area handwriting input area 104 and a manipulation button 106. The handwriting input area handwriting input area 104 may be touched by the driver's finger (the user's finger) such that the driver can perform a handwriting input using his or her finger. The manipulation button 106 may activate the handwriting input area 104 or may announce the start or end of the handwritten input. The handwriting input 104 may be a touch screen.

In FIG. 1, an X-axis and a Y-axis may denote a coordinate system established in the handwriting input device 102. Although the coordinate system is not exposed outside the handwriting input device 102, an overall input angle of the handwritten input result may be measured on the basis of the coordinate system contained in the handwriting input device 102.

Figure 2A:
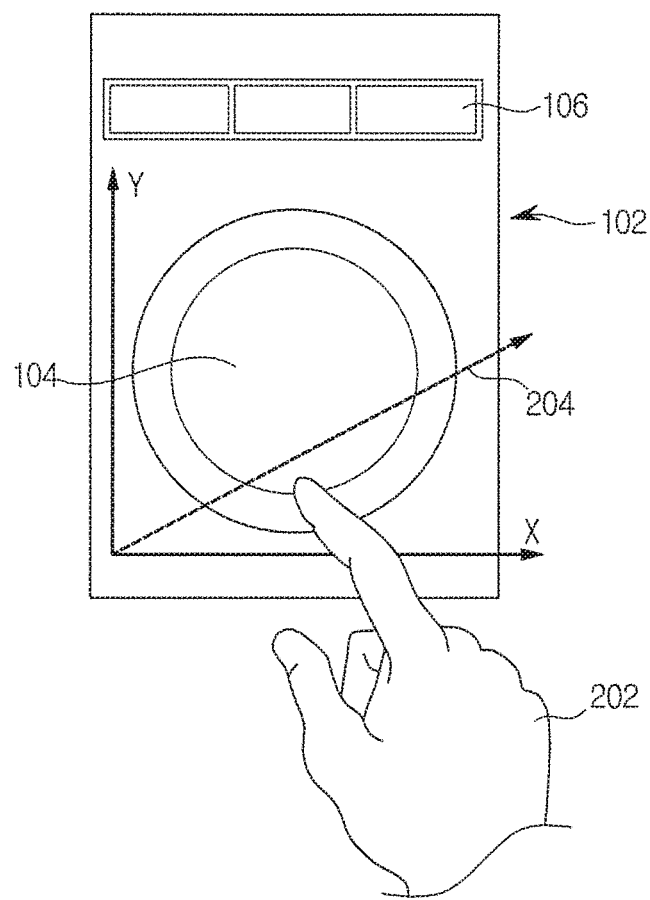
FIGS. 2A and 2B are views illustrating a handwritten input acquired by a right hand of a user on the handwriting input device shown in FIG. 1.
Figure 2B:
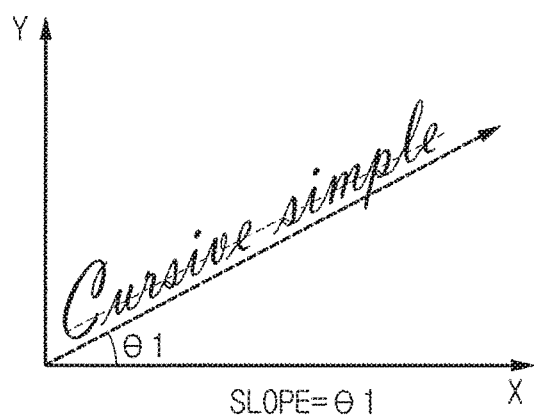

FIGS. 2A and 2B are views illustrating a handwritten input acquired by a right hand of the user on the handwriting input device shown in FIG. 1.

Referring to FIGS. 2A and 2B, when the user (or driver) seated on the driver seat of the vehicle performs a handwriting input by touching the handwriting input area 104 of the handwriting input device 102 disposed between the driver seat and the passenger seat, the right hand 202 of the user conducts a handwriting stroke in the same direction as a dotted line 204 at the position illustrated in FIG. 2A. The position and direction of the right hand 202 may be slightly different from those of FIG. 2A according to a difference in physical characteristics such as the user's height and arm length.

FIG. 2B illustrates a handwritten input result that is input through the position and direction of the right hand illustrated in FIG. 2A. Referring to FIG. 2B, the handwritten input result that is input through the right hand of the user seated on the driver seat may be rotated (tilted) by a predetermined angle θ1 (acute angle) with respect to the X-axis. As described above, the handwritten input result having rotated by the angle θ1 (acute angle) with respect to the X-axis may be incorrectly recognized due to a slope of the handwritten input result. Therefore, the rotation angle (θ1) of the handwritten input result is corrected parallel to the X-axis, and character recognition is then performed, resulting in an increased rate of character recognition.

The rotation angle of the handwritten input result may not correspond to a rotation angle of each handwritten character, and may be a representative rotation angle formed by the entire handwritten input result. Referring to "Cursive simple" indicating the handwritten input result shown in FIGS. 2A and 2B, not the rotation angle of each handwritten character ('C', 'u', or 'r') but a representative rotation angle formed by the entire handwritten input result corresponding to "Cursive simple" may be defined as a rotation angle (e.g., θ1) of the entire handwritten input result.

Figure 3A:
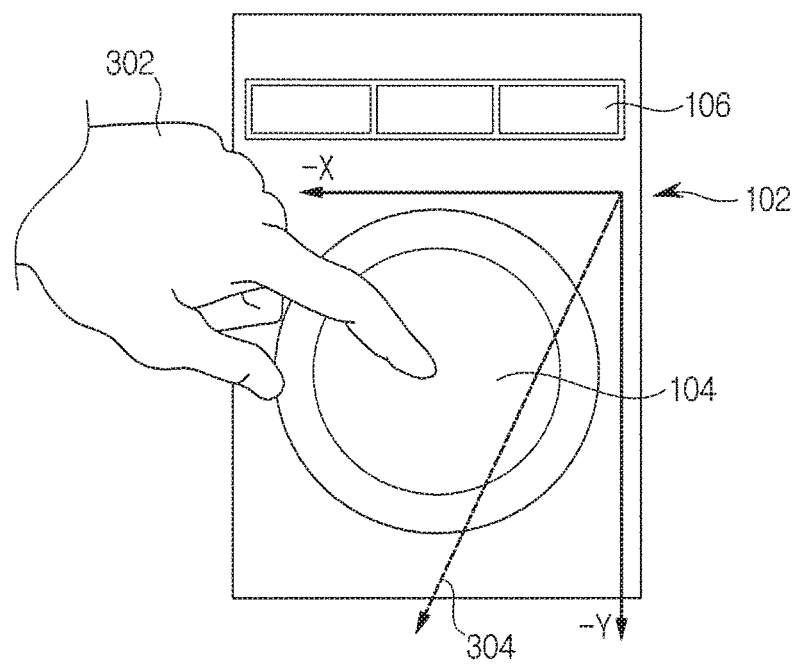
FIGS. 3A and 3B are views illustrating a handwritten input acquired by a left hand of a user on the handwriting input device shown in FIG. 1.
Figure 3B:
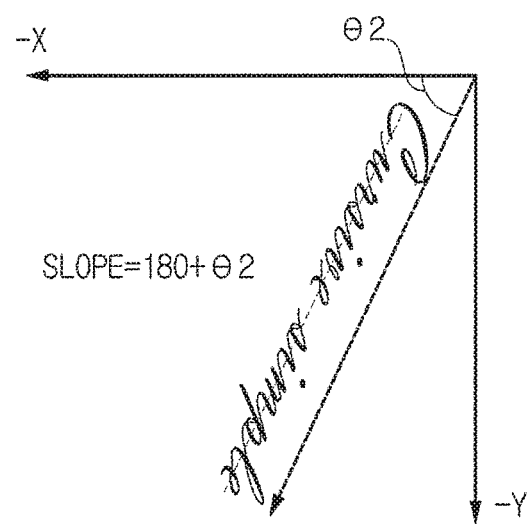

FIGS. 3A and 3B are views illustrating a handwritten input acquired by a left hand of a user on the handwriting input device shown in FIG. 1.

Referring to FIGS. 3A and 3B, when the user seated on the driver seat performs a handwriting input by touching the handwriting input area 104 of the handwriting input device 102 disposed between the driver seat and the passenger seat, the left hand 302 of the user conducts a handwriting stroke in the same direction as a dotted line 304 at the position illustrated in FIG. 3A. The position and direction of the right hand 302 may be slightly different from those of FIG. 3A according to a difference in physical characteristics such as the user's height and arm length, FIG. 3B illustrates a handwritten input result that is input through the position and direction of the left hand illustrated in FIG. 3A. Referring to FIG. 3B, the handwritten input result that is input through the left hand of the user seated on the driver seat may be rotated (tilted) by a predetermined angle 180+θ1 (obtuse angle) with respect to the X-axis. As described above, the handwritten input result having rotated by the angle 180+θ1 (obtuse angle) with respect to the X-axis may be incorrectly recognized due to a slope of the handwritten input result. Therefore, the rotation angle (180+θ1) of the handwritten input result is corrected parallel to the X-axis, and character recognition is then performed, resulting in an increased rate of character recognition.

The rotation angle of the handwritten input result may not correspond to a rotation angle of each handwritten character, and may be a representative rotation angle formed by the entire handwritten input result. Referring to "Cursive simple" indicating the handwritten input result shown in FIGS. 3A and 3B, not the rotation angle of each handwritten character ('C', 'u', or 'r') but a representative rotation angle formed by the entire handwritten input result corresponding to "Cursive simple" may be defined as a rotation angle (e.g., θ2) of the entire handwritten input result.

Figure 4:
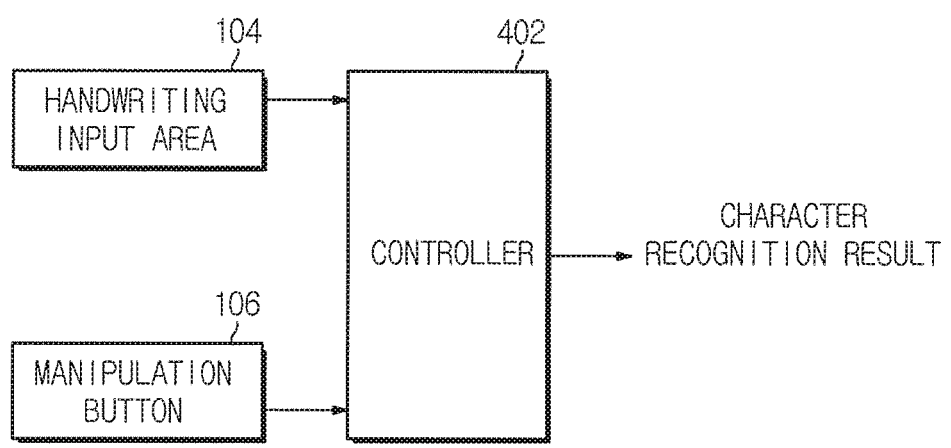
FIG. 4 is a block diagram illustrating a control system for the handwriting input device according to an embodiment of the present disclosure.

FIG. 4 is a block diagram illustrating a control system for the handwriting input device according to an embodiment of the present disclosure.

Referring to FIG. 4, a controller 402 of the handwriting input device 102 may control overall operation of the handwriting input device 102. Specifically, the controller 402 may recognize characters of a handwritten text that is input to the handwriting input device 102, and may then output the character recognition result. The handwriting input area 104 may be touched by the driver's finger (the user's finger) such that the driver can perform a handwriting input using his or her finger. The manipulation button 106 may activate the handwriting input area 104 or may announce the start or end of the handwritten input. Here, the controller 402 may be an electronic control unit (ECU).

Figure 5:
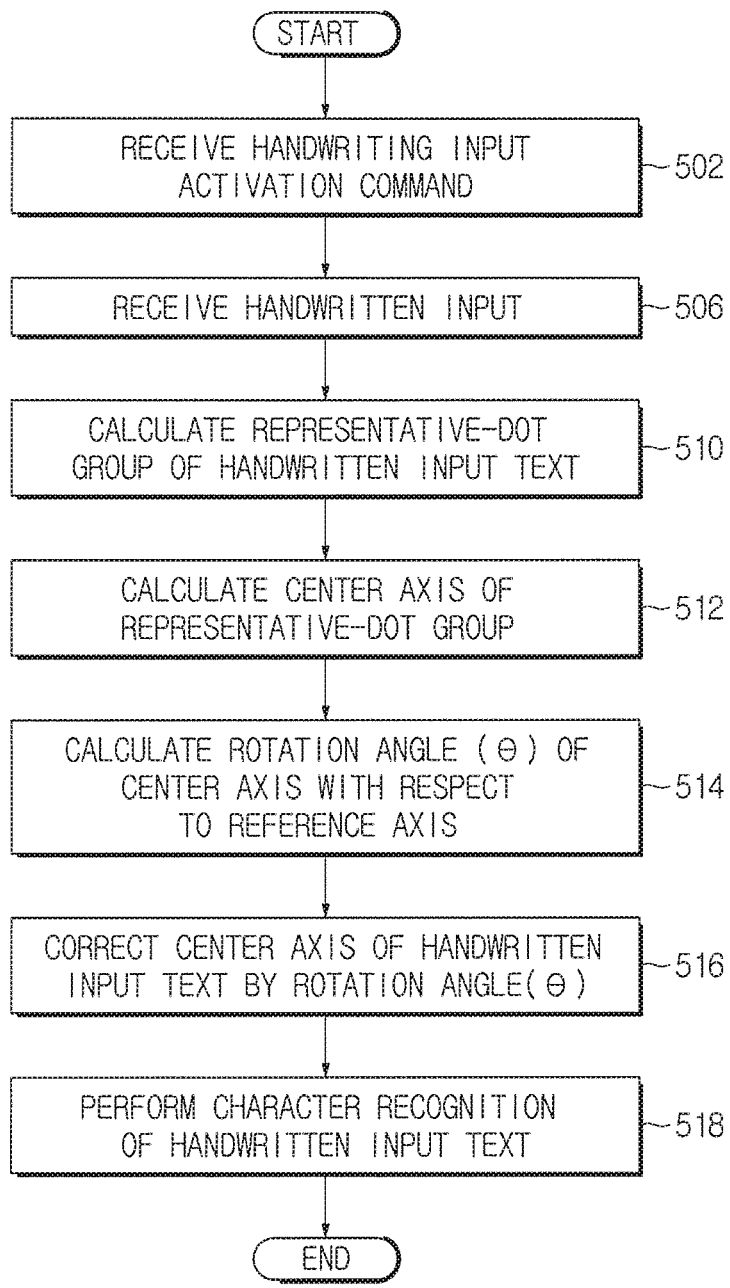
FIG. 5 is a flowchart illustrating a handwriting input recognition method according to an embodiment of the present disclosure.
Figure 6A:
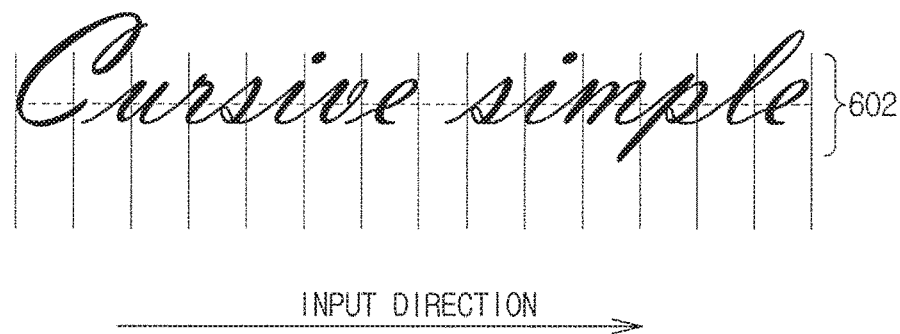
FIGS. 6A-6C are conceptual diagrams illustrating a method for measuring a rotation angle of a handwritten input text using the handwriting input recognition method according to an embodiment of the present disclosure.
Figure 6B:
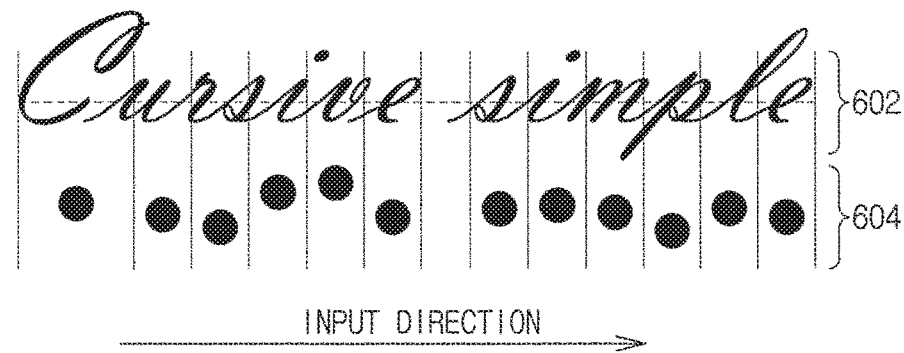
Figure 6C:
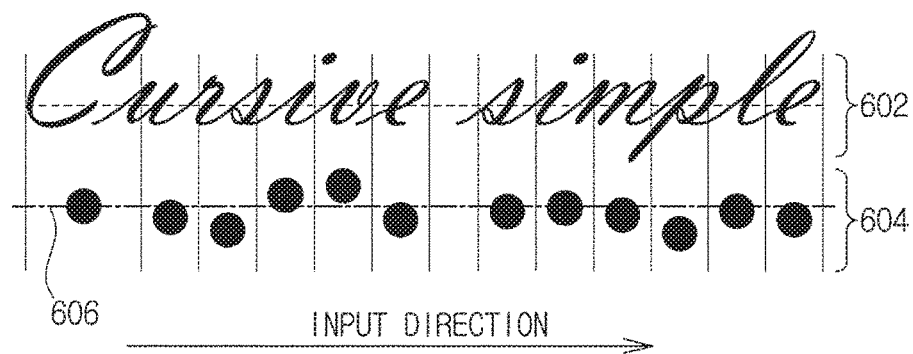
Figure 7A:
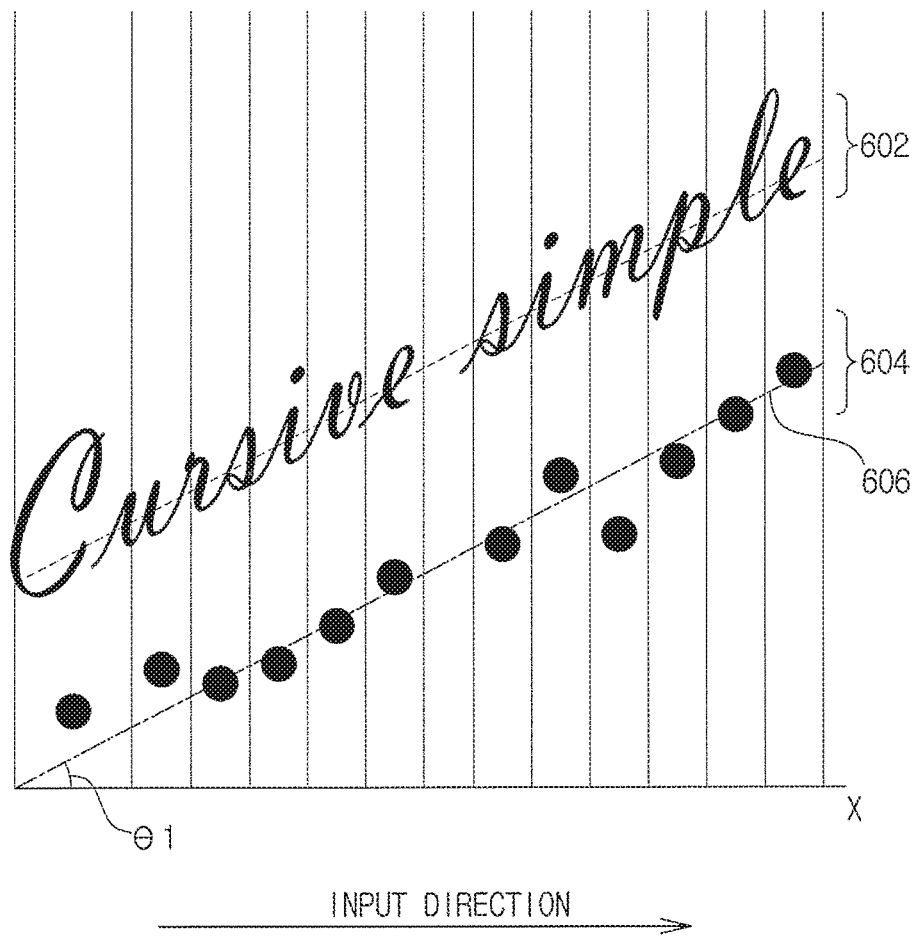
FIGS. 7A and 7B are conceptual diagrams illustrating a method for compensating for a rotation angle when an angle of a handwritten input is an acute angle.
Figure 7B:
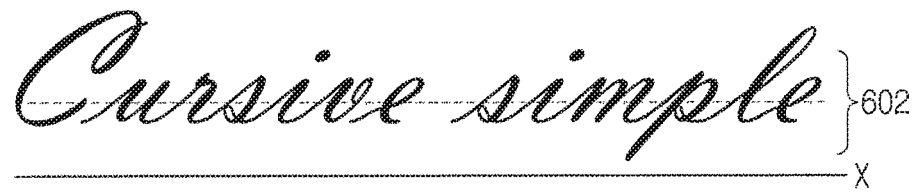
Figures 8A, 8B:
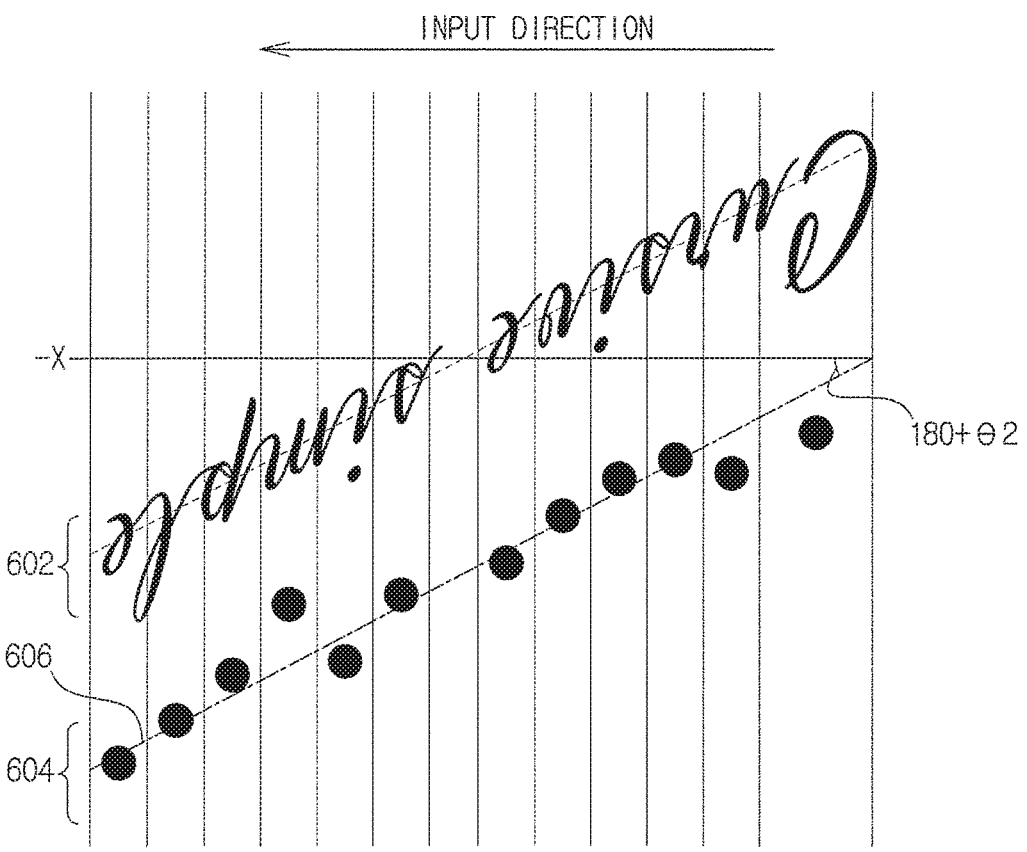
FIGS. 8A and 8B are conceptual diagrams illustrating a method for compensating for a rotation angle when an angle of a handwritten input is an obtuse angle.

A handwriting input method according to an embodiment of the present disclosure will hereinafter be described with reference to FIGS. 5 to 8. FIG. 5 is a flowchart illustrating a handwriting input recognition method according to an embodiment of the present disclosure. FIGS. 6A-6C are conceptual diagrams illustrating a method for measuring a rotation angle of a handwritten input text using the handwriting input recognition method according to an embodiment of the present disclosure. FIGS. 7A and 7B are conceptual diagrams illustrating a method for compensating for a rotation angle when an angle of a handwritten input is an acute angle. FIGS. 8A and 8B are conceptual diagrams illustrating a method for compensating for a rotation angle when an angle of a handwritten input is an obtuse angle.

When the user activates the handwriting input area 104 by operating the manipulation button 106 of the handwriting input device 102 for a handwritten input, a command for activating a handwritten input may be generated. The controller 402 of the handwriting input device 102 may receive a handwriting input activation command generated by the user's manipulation, and may activate the handwriting input area 104 in response to the received handwriting input activation command (502).

Subsequently, the user may perform a handwritten input by touching the handwriting input area 104 of the handwriting input device 102. When the user generates a handwritten input, the handwriting input device 102 may receive the generated handwritten input (506). The user's handwritten input may be accompanied by announcement of the start and end of a handwritten input. Announcement of the start and end of the handwritten input may be generated by manipulation of the manipulation button 106 of the handwriting input device 102. The controller 402 of the handwriting input device 102 may recognize a user-input content, that is, generated between the announcement time of the start of a handwritten input and the announcement time of the end of a handwritten input, as a valid handwritten input generated by the user, FIG. 6A illustrates a handwritten-input-completed text 602. The handwritten input may start from 'C' of "Cursive", and may be ended at 'e' of "simple".

Referring back to FIG. 5, the controller 402 of the handwriting input device 102 may calculate a group of representative dots of a handwritten-input-completed text (510). Alternatively, when at least a predetermined number of characters is input even on the condition that the handwritten input text is not fully input, a task for discriminating an angle of a center axis of the handwritten input text may be immediately started. For example, although 'Cu' or 'C' of "Cursive Simple" is input, a task for discriminating an angle of the center axis of the handwritten input text may be started. FIG. 6B illustrates a group of representative dots 604 of a handwritten-input-completed text 602. As shown in FIG. 6B, a distribution of representative dots may occur in different ways according to the size, shape, and position of each of the plurality of characters constructing the handwritten input text 602. Calculation of representative dots may be achieved as follows. A grid arranged at intervals of a predetermined number of pixels may be established in the handwriting input area 104. When the handwritten input is completed, coordinates of each of the plurality of characters constructing the handwritten input text 602 within each grid may be calculated, and a plurality of representative dots may be calculated on the basis of an average value or center point of the coordinates. For example, an average value of the coordinates of the region occupied by 'C' of "Cursive" may be acknowledged as a representative point, or the center point of the region occupied by 'C' may be acknowledged as a representative point. When a plurality of characters is input, a plurality of representative points may be calculated, the representative dots of a group of texts may be treated in a unified manner.

Referring back to FIG. 5, when calculation of the group of representative dots 604 composed of a plurality of representative dots is completed, the controller 402 of the handwriting input device 102 may calculate the center axis of the group of representative dots 604 (512). The center axis 606 of the group of representative dots 604 is shown in FIG. 6C. The center axis 606 may denote a segment representing linearity shown in the group of representative dots 604. Alternatively, the center axis 606 may represent linearity formed by the entirety of the handwritten input text 602. The embodiment of the present disclosure may estimate a rotation angle of the handwritten input text 606 through the rotation angle of the center axis 606. A Least squares method or an Averaging method may be applied to coordinates (positions) of the respective representative dots constructing the group of representative dots 604 so as to calculate the center axis 606.

Referring back to FIG. 5, when the center axis 606 of the handwritten input text 602 is acquired, the controller 402 of the handwriting input device 102 may calculate a rotation angle (θ) of the center axis 606 with respect to a reference axis (514). In FIG. 7A, the rotation angle of the handwritten input text 602 may be denoted by θ1. That is, the handwritten input text 602 may be tilted by 81 with respect to the X-axis. In FIG. 8A, the rotation angle of the handwritten input text 602 may be denoted by 180+θ2. In other words, the handwritten input text 602 may be tilted by 180+θ2 with respect to the X-axis.

As can be seen from a handwritten input shown in FIGS. 8A and 8B, the handwritten characters are upside down without consideration of an input direction, such that character recognition of the handwritten input may be achieved. In this case, it may be difficult to anticipate the correct character recognition result. Therefore, the rotation angle of the handwritten input text 602 may be calculated in consideration of the handwritten input direction so as to perform accurate character recognition.

When the center axis 606 of the handwritten input text 602 is arranged parallel to a positive Y-axis (i.e., 90°) or is arranged parallel to a negative(−) Y-axis (i.e., 270°), the number of grids for extracting the representative dots is reduced, such that it may be a little difficult to calculate the correct center axis 606. After the group of representative dots 604 is calculated from all the horizontal and vertical directions of the handwritten input text 602, when the representative-dot group 604 compatible with the handwritten input direction is used in further consideration of the handwritten input direction, the center axis 606 identical to the actual handwritten input direction may be calculated.

In addition, representative dots may also be calculated on the basis of the number of input coordinates or at a predetermined time intervals, and classification of strokes of a handwritten input, without consideration of representative-dot calculation based on the grid. Through the above-mentioned method for calculating the representative dots, a high rate of character recognition can be expected when it is possible to discriminate among the respective characters.

Referring back to FIG. 5, assuming that the handwritten input text 602 is tilted by θ1 or 180+θ2 on the basis of the X-axis indicating the reference axis as described above, the controller 402 of the handwriting input device 102 may correct a slope of the handwritten input text 602 by the rotation angle (θ1 or 180+θ2), and the resultant rotation angle is changed to a normal angle parallel to the X-axis indicating the reference axis (516). That is, when the controller 402 rotates the handwritten input text 602 counter-clockwise by the rotation angle (θ1 or 180+θ2) (i.e., when the controller 402 rotates the handwritten input text 602 by the rotation angle (−θ1 or −180−θ2)), the slope of the handwritten input text 602 may be arranged parallel to the X-axis. FIGS. 7B and 8B illustrate the normalized handwritten input text 602 in which the rotation angle is completely corrected.

Referring back to FIG. 5, when the rotation angle of the handwritten input text 602 is completely corrected, the controller 402 of the handwriting input device 102 may perform character recognition of the handwritten input text 602 acquired by correction of the rotation angle (518). Since the slope of the handwritten input text 602 is normalized to be parallel to the reference axis (X-axis), the controller 602 may perform character recognition of the handwritten input text 602 using the character recognition algorithm, and may output the character recognition result to the outside.

As is apparent from the above description, the embodiment of the present disclosure corrects a slope of handwritten input text even though the text is input while being tilted at a predetermined angle, performs conversion of the handwritten input text using the predetermined angle, and performs character recognition, thereby increasing the character recognition rate.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A character recognition method for a handwriting input device, the method comprising steps of:
   receiving, by a handwriting input area, a handwritten input text from a user;
   calculating, by a controller, a center axis of the handwritten input text;
   calculating, by the controller, a rotation angle of the center axis based on a reference axis;
   correcting, by the controller, a slope of the handwritten input text by the rotation angle so that the slope of the handwritten input text is parallel to the reference axis; and
   performing, by the controller, character recognition of the handwritten input text acquired by correction of the slope.

2. The character recognition method according to claim 1, further comprising:
   calculating, by the controller, a group of representative dots of the received handwritten input text; and
   calculating, by the controller, the center axis of the handwritten input text from the group of representative dots.

3. The character recognition method according to claim 2, wherein the group of representative dots of the handwritten input text is a set of representative dots of each of a plurality of characters constructing the handwritten input text.

4. The character recognition method according to claim 3, wherein representative dots are acquired from respective coordinates of the plurality of characters constructing the handwritten input text within a grid arranged at intervals of a predetermined number of pixels.

5. The character recognition method according to claim 4, wherein the representative dots are acquired based on an average value of the representative coordinates of the plurality of characters constructing the handwritten input text.

6. The character recognition method according to claim 4, wherein the representative dots are acquired based on a center point of the respective coordinates of the plurality of characters constructing the handwritten input text.

7. The character recognition method according to claim 1, further comprising:
   calculating, by the controller, the center axis of the handwritten input text by performing a least squares method on respective coordinates of representative dots constructing a group of the representative dots.

8. The character recognition method according to claim 1, further comprising:
   calculating, by the controller, the center axis of the handwritten input text by performing an averaging method on respective coordinates of a plurality of representative dots constructing a group of the representative dots.

9. The character recognition method according to claim 1, wherein the step of calculating the center axis includes:
   detecting an input direction of the handwritten input text;
   determining whether an angle between the rotation angle and the reference axis is an acute angle or an obtuse angle; and
   calculating the center axis based on the detection result of the input direction and the determining result of the acute angle or the obtuse angle.

10. The character recognition method according to claim 1, further comprising:
   starting, by the controller, a task for discriminating an angle of the center axis of the handwritten input text even when the handwritten input text is partially input.

11. A handwriting input device comprising:
   a handwriting input area configured to receive a handwritten input text from a user; and
   a controller configured to calculate a center axis of the handwritten input text, calculate a rotation angle of the center axis based on a reference axis, correct a slope of the handwritten input text by the rotation angle so that the slope of the handwritten input text is parallel to the reference axis, and perform character recognition of the handwritten input text acquired by correction of the slope.

12. The handwriting input device according to claim 11, wherein the controller calculates a group of representative dots of the received handwritten input text, and calculates the center axis of the handwritten input text from the group of representative dots.

13. The handwriting input device according to claim 12, wherein the group of representative dots of the handwritten input text is a set of representative dots of each of a plurality of characters constructing the handwritten input text.

14. The handwriting input device according to claim 11, wherein the controller acquires representative dots from respective coordinates of a plurality of characters constructing the handwritten input text within a grid arranged at intervals of a predetermined number of pixels.

15. The handwriting input device according to claim 14, wherein the controller acquires representative dots based on an average value of the representative coordinates of the plurality of characters constructing the handwritten input text.

16. The handwriting input device according to claim 14, wherein the controller acquires representative dots based on a center point of the respective coordinates of the plurality of characters constructing the handwritten input text.

17. The handwriting input device according to claim 11, wherein the controller calculates the center axis of the handwritten input text by performing a least squares method on respective coordinates of representative dots constructing a group of the representative dots.

18. The handwriting input device according to claim 11, wherein the controller calculates the center axis of the handwritten input text by performing an averaging method on respective coordinates of a plurality of representative dots constructing a group of the representative dots.

19. The handwriting input device according to claim 11, wherein the controller detects an input direction of the handwritten input text, determines whether an angle between the rotation angle and the reference axis is an acute angle or an obtuse angle, and calculates the center axis based on the detection result of the input direction and the determination result of the acute angle or the obtuse angle.

20. The handwriting input device according to claim 11, wherein the controller starts a task for discriminating an angle of the center axis of the handwritten input text even when the handwritten input text is partially input.

* * * * *